United States Patent [19]

Gorlov

[11] 4,103,490

[45] Aug. 1, 1978

[54] APPARATUS FOR HARNESSING TIDAL POWER

[76] Inventor: Alexander Moiseevich Gorlov, 234 Main St., Brighton, Mass. 02155

[21] Appl. No.: 781,949

[22] Filed: Mar. 28, 1977

[51] Int. Cl.² ............................................. F03B 13/12
[52] U.S. Cl. ...................................... 60/398; 60/412; 417/100; 417/339; 417/347
[58] Field of Search ............... 60/398, 407, 409, 412, 60/502, 497; 417/100, 330, 339, 347

[56] References Cited

U.S. PATENT DOCUMENTS

| | | | |
|---|---|---|---|
| 1,875,042 | 12/1907 | Bissell | 60/398 |
| 2,484,183 | 10/1949 | Paulson | 60/398 |
| 2,972,869 | 2/1961 | Jensen | 60/409 X |
| 3,925,986 | 12/1975 | Barwick | 60/398 |

Primary Examiner—Allen M. Ostrager
Assistant Examiner—Stephen F. Husar
Attorney, Agent, or Firm—Weingarten, Maxham & Schurgin

[57] ABSTRACT

An apparatus for harnessing and extracting a portion of the power generated by the rise and fall of ocean tides. A tidal chamber is provided wherein the rise of the tide creates positive air pressure within the tidal chamber and the fall of the tide creates a partial vacuum within the tidal chamber. The pressure and partial vacuum are, through appropriate valving, used to drive a pair of reciprocating, fluid-coupled rod and float assemblies, the motions of which can be harnessed to operate an air compressor, crank shaft, flywheel or other suitable mechanical device.

6 Claims, 8 Drawing Figures

APPARATUS FOR HARNESSING TIDAL POWER

FIELD OF THE INVENTION

This invention relates in general to devices for deriving useful power from the continuous tidal motion of the oceans and, in particular, to an apparatus for extracting power in readily usable form from tidal motion. Even more precisely, this invention pertains to systems in which the rise and fall of the tides is used to establish pressure variations in a supply of air.

BACKGROUND OF THE INVENTION

Several devices for utilizing the rise and fall of the tides or wave action to impart motion to mechanical systems are well known in the prior art. For example, such devices are the subjects of U.S. Pat. Nos. 378,452; 603,314; 1,036,502; 1,455,718; 1,623,341; 2,484,183; 3,268,154; 3,690,790; 3,697,764; and 3,925,986. The last of such listed patents contains a summary description of several of the earlier listed patents and is a particularly useful background reference. So as not to be unnecessarily repetitive, only those listed patents not summarized in U.S. Pat. No. 3,925,986 will be summarized below.

U.S. Pat. No. 603,314 provides for an apparatus for using tidal motion to compress air. The apparatus comprises a vertical standard having a centrally pivotally mounted beam supported thereon, the pivotal mounting permitting the beam to rotate in a vertical plane, a float attached to one end of the beam and a piston driven air compressor attached to the other end of the beam. U.S. Pat. No. 603,314 does not suggest the use of a tide to create an air pressure or vacuum or the use of such a pressure/vacuum to drive a pair of fluid-coupled reciprocating piston rods.

Another system for using wave motion to compress air is shown in U.S. Pat. No. 1,036,502, in which a large platform is used as a float, and cylinders anchored below the platform operate directly as air compression cylinders with piston rods secured to the float platform. This patent does not suggest a low pressure/partial vacuum system used to drive a pair of reciprocating, fluid-communicated cylinder rods, as exemplified by my invention.

U.S. Pat. No. 1,455,718 shows a hydropneumatic device actuated by waves, including a submergible chamber having a water entrance and an outlet for the air displaced by the entering water, means to collect such air and an automatic system for raising and lowering the chamber according to the state of the tide in order to pump air from the chamber, under pressure. None of the features of my invention described in the two preceding paragraphs are present or suggested in this patent.

U.S. Pat. No. 2,484,183 discloses still another device for using a tide to compress air and to create a partial vacuum, both of which are employed to drive a turbine. The system shown incorporates a main tank in which the changing water level causes air pressure to correspondingly vary; an auxiliary tank connected to the main tank through a one-way check valve, the auxiliary tank being used to hold pressurized air; and a suitably valved port for supplying air at atmospheric pressure to the main tank when partial vacuum conditions exist therein. Both the latter port and an outlet port from the auxiliary tank are connected directly to an air driven turbine. As with the aforementioned patents, U.S. Pat. No. 2,484,183 lacks the essential combination of elements characterizing my invention.

A tide driven power generator operated by both pressure and partial vacuum is also disclosed in U.S. Pat. No. 3,925,986. A valve is used to control the direction of air flow to the turbine, which is dependent upon whether positive pressure or partial vacuum is being used to activate the turbine, the valve being controlled by a diaphragm member responsive to air pressure changes in the tidal chamber attributable to the raising or lowering of the tide. Among other notable distinguishing features, my present invention employs a two-state valve means permitting either positive air pressure or partial vacuum to drive the system, the status of the valve being controlled by the physical position of the driven components rather than by a pressure differential.

BRIEF SUMMARY OF THE INVENTION

In a preferred embodiment for the present invention, an apparatus for extracting power from the tides is shown having a housing mounted on the ocean bed with ports of ingress and egress near the bottom or lower part of the housing, through which tidal waters may flow, valves for permitting low pressure air built up in the housing by rising tides to escape therefrom and air from external sources to enter the housing in response to low pressure partial vacuum conditions within the housing, which will be caused by falling tides. The housing is connected through these ports to a two-state valve having two input ports and two output ports. The output ports of this valve are connected to a second housing having two chambers, one of such ports being connected to each chamber.

The second housing contains a liquid equal in volume to approximately half the volume of the housing and is divided into the aforesaid two chambers by means of a partial partition wall extending downward from the top of the housing toward, but not meeting, the bottom thereof, so that the two chambers are in fluid communication with each other. While a wide variety of liquids may be usable for this purpose, it is preferred that the liquid not react corrosively or in any other adverse fashion with the second housing. For a metal housing, a liquid such as oil or antifreeze is therefore well suited. A float is disposed in each chamber and a piston rod attached to each of said floats extends through the top of the housing at a sealed aperture. The state or condition of the two-state valve is controlled by the position of the floats or cylinder rods by any appropriate mechanism such that the valve is in a first state when a first of said floats is descending and is in the second of such states when the second float is descending. The reciprocating action of the piston rods may be used to drive any suitable device for obtaining useful power output. In the preferred embodiment, the float rods are used to drive a pair of pistons in conventional air compression cylinders. An alternate embodiment shows the use of the reciprocating motion of the float rods to rotate a crank shaft.

The second housing need not be exposed to the tide. Thus, the second housing and the apparatus contained therein may be isolated from the corrosive effects of the ocean salt water environment. This both lowers the construction cost and contributes to the useful life of the present invention.

BRIEF DESCRIPTION OF THE DRAWINGS

These and other features of the present invention are more fully described below in the detailed description of the preferred embodiment, and in the accompanying drawing of which.

DETAILED DESCRIPTION OF THE INVENTION

Figure 1:
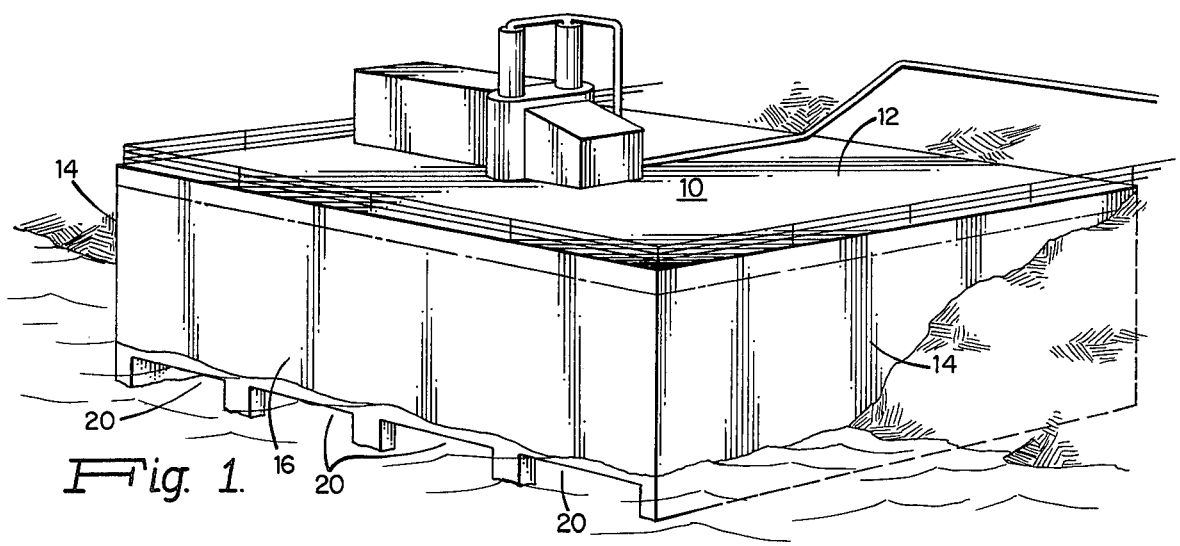
FIG. 1 is a pictorial, perspective view of the exterior of an apparatus for harnessing tidal power according to my invention.
Figure 2:
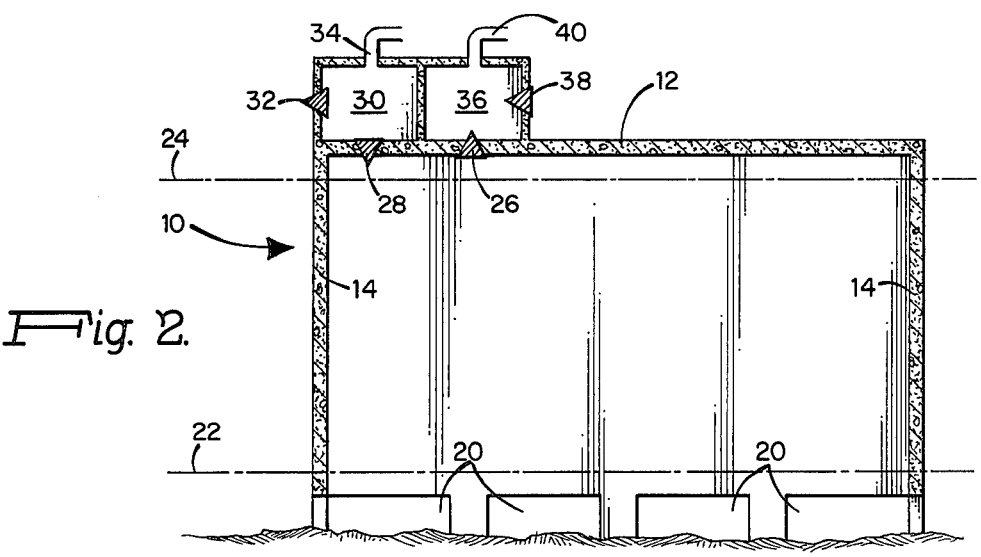
FIGS. 2-4 are sectional, schematic illustrations of the main housing of my invention together with the associated inlet and outlet pressure relief valving.
Figure 3:
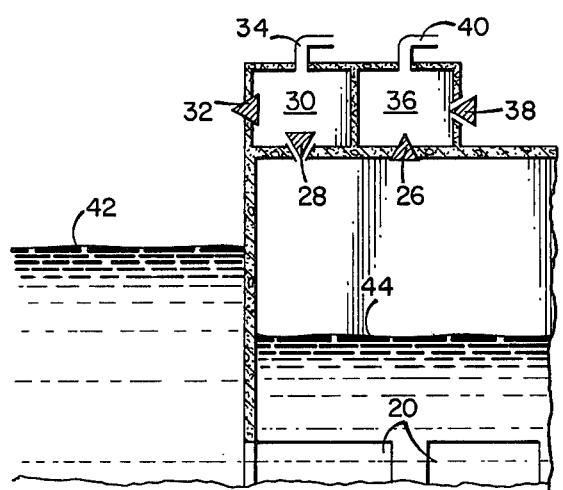
Figure 4:
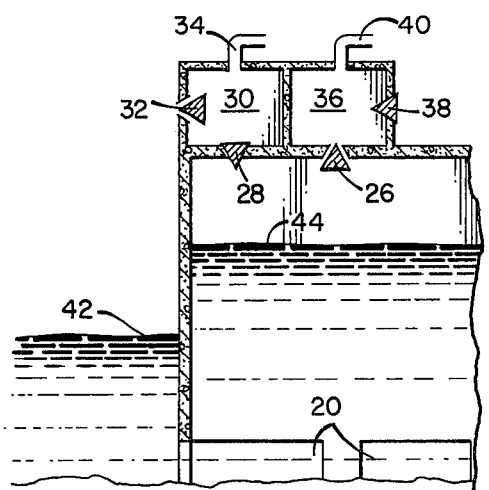

The present invention contemplates apparatus for harnessing and extracting a portion of the power generated by the rise and fall of ocean tides. The external structure of a preferred embodiment of the invention is shown in FIG. 1. As illustrated, a main housing 10 comprised of a roof or deck 12 and pair of side walls 14, an end wall 16 and another end wall opposite 16, but not shown, rests upon the ocean floor 18. End wall 16 is provided at the lower end thereof with a multiplicity of ports which permit the ingress and egress of tidal waters. It is intended that housing 10 be dimensionally planned such that the ports 20 are placed below the level of a normal low tide, represented by line 22, and that the roof 12 be at a height from the ocean floor 18 slightly greater than the height of a normal high tide, represented by the line 24. If the walls and the roof of the main housing are made of a nonporous material and are joined with air-tight seams, main housing 10 becomes basically an air-tight structure, so that air flow into and out of the main housing is controlled by valves 26 and 28 respectively. Referring now to FIG. 3, it will be observed that a rising tide 42 will cause the water level 44 inside housing 10 to rise, resulting in an increase in air pressure within the housing. This increased air pressure will force valve 28 to open, causing a corrresponding increase in pressure within chamber 30, which pressure will close valve 32. The air pressure within housing 10 will then flow through valve 28 and out of chamber 30 through port 34. As explained in greater detail below, this pressurized air stream will be used to perform useful work and then returned via port 40 to chamber 36, forcing valve 38 to open, releasing the pressure from the system. A valve 26 does not open because the pressure within housing 10 will normally be greater than that within chamber 36 and, even for a completely lossless system, the pressure within chamber 36 can, at most, equal the pressure within the main housing. Conversely, as the tide 42 falls and the water level 44 within housing 10 drops to meet the tide, a partial vacuum will be created within the main housing. As illustrated in FIG. 4, this will cause valve 26 to open, a low pressure to be created in chamber 36, valve 38 to close and the partial vacuum to be transmitted to the remainder of the system through port 40 to do useful work. This partial vacuum will then be communicated back to port 34, which will reduce the pressure in chamber 30 and open valve 32 to let atmospheric air into the system to equalize the pressure. Valve 28 will not open because the pressure in chamber 30 cannot be any less than that in the main housing.

Figure 5:
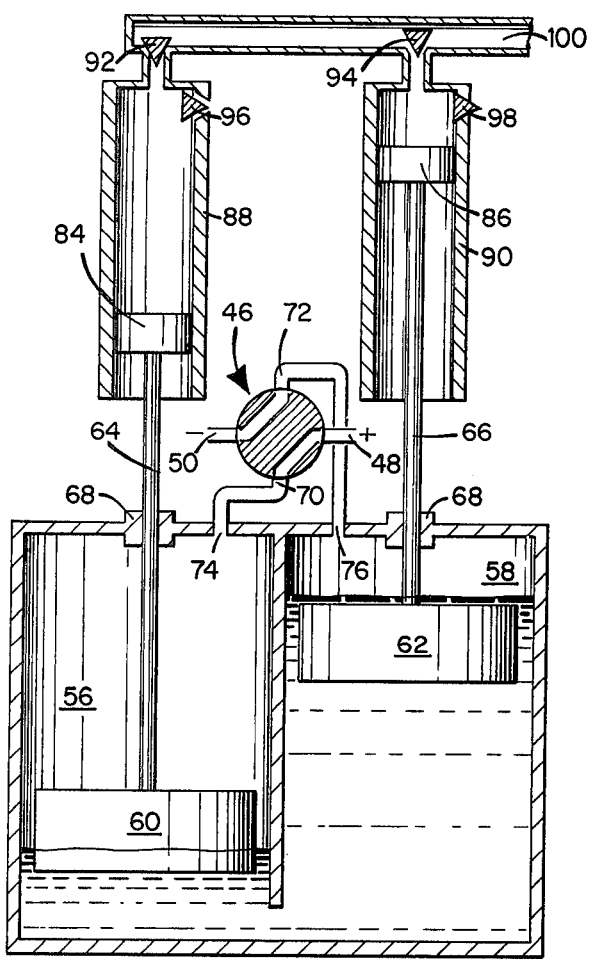
FIGS. 5 and 6 are sectional, schematic illustrations of the auxiliary housing of my invention showing the two states of the control valve.

The actual useful output from the system is obtained by means of apparatus such as that shown in FIG. 5. A four-port, two-state valve generally designated 46 permits this apparatus to provide continuous output when driven by either positive air pressure or partial vacuum. A first port 48 of valve 46 is connected to port 34 of chamber 30 and a second port 50 of valve 46 is connected to port 40 of chamber 36, although it is to be realized that these connections could be reversed without any change in the operation of the apparatus. For purposes of subsequent discussion, I choose to term ports 48 and 50 the first and second input port of valve 46. The two remaining ports of valve 46 are connected to a pair of ports communicating with the inside of an auxiliary housing 52. Auxiliary housing 52 is, except for the aforementioned ports, a fluid-tight compartment having a partial partition wall 54, of a nonporous substance, extending from the top of the auxiliary housing downward toward, but not meeting, the bottom thereof and dividing auxiliary housing 52 into two approximately equal chambers. A liquid, such as water, approximately half fills auxiliary housing 52 and provides fluid communication between the first and second chambers thereof, labelled numerals 56 and 58 respectively.

Within each of chambers 56 and 58 is placed a float, 60 and 62. These floats substantially occupy the cross-sectional area of chambers 56 and 58 in a plane perpendicular to that of the paper but do not come so close to the inner surfaces of housing 52 or partition wall 54 as to be in frictional contact therewith. Each of these floats is attached to a rod 64 and 66, respectively. Rods 64 and 66 extend vertically upward and outward through the wall of auxiliary housing 52 through a low friction seal in an aperture in the housing wall, generally indicated as numeral 68, the construction features of which are not part of my invention and, therefore, are not shown in detail.

Following the convention adopted above, the two previously unidentified ports of valve 46 will be referred to as first and second outlet ports 70 and 72, respectively. The first and second chambers of auxiliary housing 52 each have a single combination input/output port. Input/output port 74 of the first chamber is connected to first output port 70 of valve 46, while the input/output port 76 of the second chamber is connected to the second output port 72 of valve 26.

Figure 6:
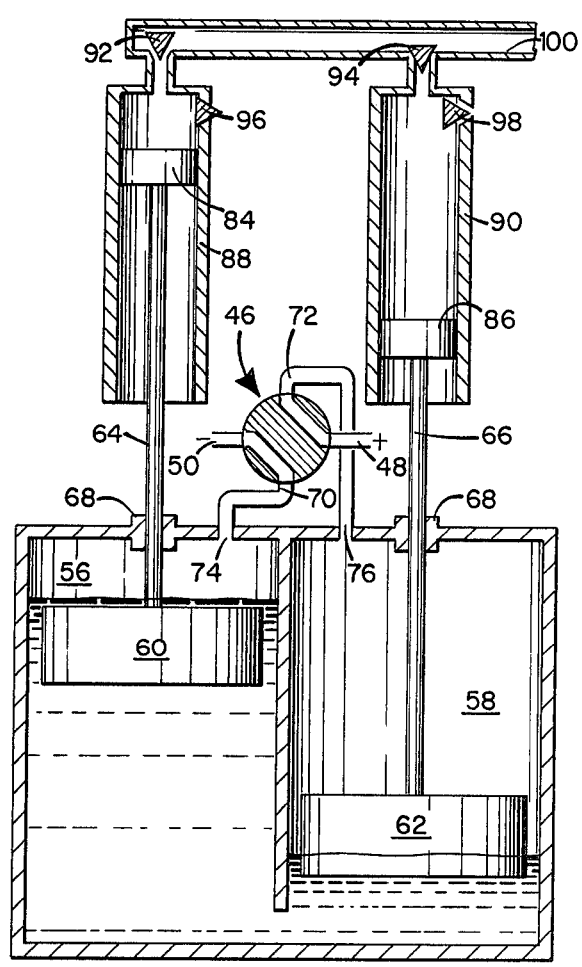
Figure 7:
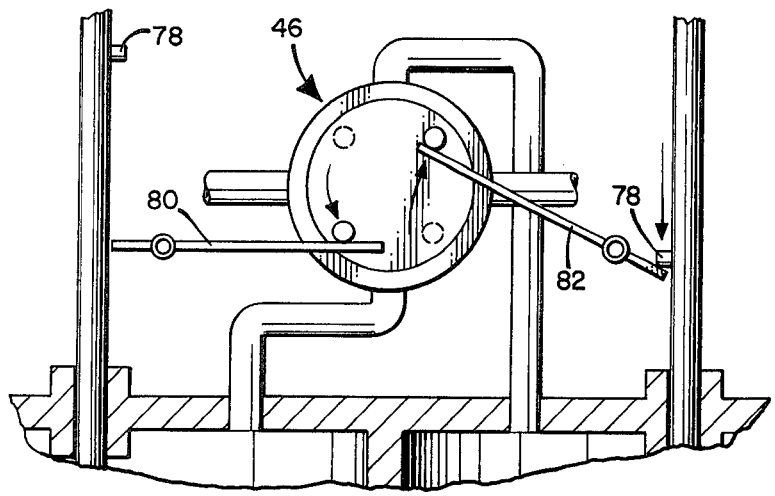
FIG. 7 is a partial sectional, schematic illustration of the control mechanism for the two state valve assembly.

Valve 46 is illustratively shown in FIG. 5 in a first state wherein the first input port thereof 48 is connected to the first output port thereof 70 and the second input port thereof 50 is connected to the second output port thereof 72. FIG. 6 illustrates the second state of valve 46 in which the first input port 48 is connected to the second output port 72 and the second input port 50 is connected to the first output port 70. It will be observed that the difference between the two states of valve 46 involves merely a 90° rotation of the valve relative to the input and output ports, about an axis through the center of the valve and extending perpendicular to the plane of the paper. A simple mechanical structure for effectuating the changing of states of switch 46 is provided in FIG. 7, although it should be realized that valve 46 may be constructed in many different ways and can be activated by several different types of apparatus including for example, an electric motor. The manner in which the valve switching apparatus functions will be better understood in conjunction with the discussion below explaining the operation of the apparatus shown in FIGS. 5 and 6.

A positive pressure applied to the first input port 48 of valve 46 by a rising tide will force the water level in the first chamber of the auxiliary housing to move downward, carrying float 60 with it. The water forced out of the first chamber will escape under partition wall 54 into the second chamber 58, carrying float 62 upward and pushing the air which is displaced from chamber 58 by the rising water level out port 76, through valve 46 and out port 50, back to chamber 36 to be exhausted through valve 38. As float 60 nears its downward limit of travel, but shortly prior to doing so, a nub 78 on rod 64 contacts and pushes down upon the short end of a pivoted lever arm 80, the other, longer end of which pushes up upon one of two diametrically opposed pegs on the rotatable housing of valve 46, turning the valve 90° clockwise to the second state. Referring to FIG. 6 which illustrates the second state of valve 46, the positive pressure applied to first input port 48 of valve 46 is now transmitted to the second chamber of auxiliary housing 52, causing the reverse motion as previously described in connection with FIG. 5. As float 62 nears its lower limit of travel, a nub on rod 66 contacts the short end of a lever arm 82, pushing down thereon, which motion is transformed into an upward motion of the long end of the lever arm, pushing the second of the two diametrically opposed pegs on the rotatable housing 46 upward, rotating the housing counterclockwise 90° back to the first state thereof.

Conversely, it will be appreciated that a partial vacuum connected to second input port 50 of valve 46 will cause the same type of mechanical motion of floats 60 and 62 and their rods 64 and 66.

One type of useful output which can be obtained from the reciprocating motions of rods 64 and 66 is a stream of compressed air. As shown in FIGS. 5 and 6, the ends of rods 64 and 66 respectively opposite floats 60 and 62 may be connected to pistons 84 and 86 in air compression cylinders 88 and 90. As in conventional air compressors, when the piston is drawn downward (outward), the output valve (92 or 94) will be closed due to the decrease in air pressure within the cylinder, and the intake valve (96 or 98) will be open to permit atmospheric air to enter the cylinder. When the motion of the piston is reversed, the pressure within the cylinder rises, compressing the air, closing the intake valve and opening the output valve, permitting a compressed air stream to flow out of port 100.

Figure 8:
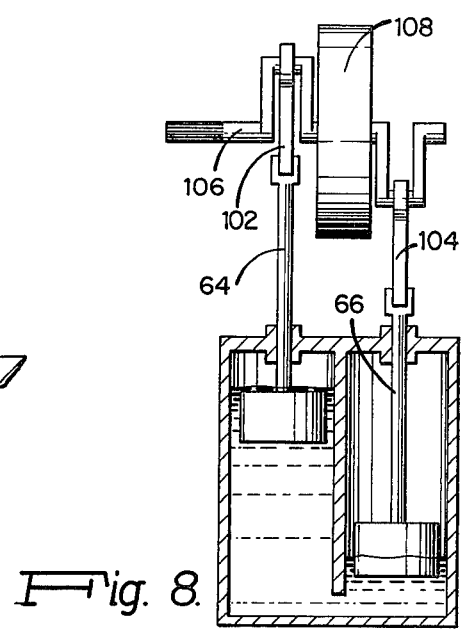
FIG. 8 is a sectional, schematic illustration of an alternate embodiment of my invention in which the float rods are used to turn a crank shaft on which has been mounted a flywheel.

In an alternate embodiment illustrated in FIG. 8, rods 64 and 66 are pivotally attached to connecting rods 102 and 104 which are further totally connected to a crank shaft 106, to transform the reciprocating linear motion of rods 64 and 66 into rotary motion of the crank shaft. The crank shaft may be equipped with a flywheel 108, as shown, if desired.

From the foregoing description, it should be understood that the rate at which rods 64 and 66 reciprocate is a direct function of the magnitude of the pressure or partial vacuum produced within main housing 10. The above-described embodiments for the present invention are illustrative only, alterations and modifications being deemed to be within its scope and spirit. The breadth of the invention is intended to be limited only as defined in the following claims.

What is claimed is:

1. An apparatus for extracting usable power from a tidal water flow, comprising:

means for creating a low, positive pressure air flow in response to a rising tide and a partial vacuum in response to a falling tide;

first and second chambers, the lower portions of which are in fluid combination with each other;

in said chambers, a liquid having a volume approximately equal to half the sum of the volumes of said first and second chambers;

each of said chambers having an inlet/outlet port located near the top thereof;

a multi-state valve for connecting, in a first state, a first input port thereof to a first output port thereof and a second input port thereof to a second output port thereof and, in the second state, connecting the first input port to the second output port and the second input port to the first output port;

the first output port of the valve being connected to the inlet/outlet port of the first chamber and the second output port of the valve being connected to the inlet/outlet port of the second chamber;

each chamber having a float therein, said float being disposed to ride upon the surface of the liquid in the chamber;

the means for creating positive pressure air flow and partial vacuum being connected to the multi-state valve to supply the positive pressure air flow to a first input port thereof and to supply the partial vacuum to the second input port thereof, whereby the liquid level in each chamber is responsive to the difference in the pressures in the chambers, above the surface of the liquid;

each of said floats being attached to a rod which extends generally vertically through the housing in a fluid-sealed aperture;

the valve being in the first state while the liquid level and float in the first chamber are descending;

means for switching the valve to a second state when the float in the first chamber nears the lower end of its range of travel and, equivalently, when the float in the second chamber nears the upper end of its range of travel;

the valve being in the second state while the liquid level and float in the second chamber are descending;

means for switching the valve to the first state when the liquid in the second chamber nears the lower end of its range of travel and, equivalently, when the float in the first chamber nears the upper end of its range of travel; and means operable by the reciprocating motion of at least one of said rods to provide output power.

2. The apparatus of claim 1 wherein the first and second chambers comprise a single housing having a partial partition wall extending downward from the top of the housing toward, but not meeting, the bottom thereof.

3. The apparatus of claim 2 wherein the means operable by the reciprocating motion of a rod comprises a piston attached to a rod, said piston being reciprocable within a cylinder for compressing air.

4. The apparatus of claim 2 wherein the means operable by the reciprocating motion of a rod comprises means for rotating a crank shaft.

5. The apparatus of claim 2 wherein the means for creating a low, positive pressure air flow in response to a rising tide and a partial vacuum in response to a falling tide comprises:

- a housing or tank resting upon the floor of the ocean in tidal water;
- said housing having an opening near the bottom thereof for permitting the ingress and egress of tidal water;
- said opening being below the water level of a normal low or ebb tide;
- the housing having a top and sides, the sides extending below the water level of an ebb tide;
- the housing having an outlet port for exhausting pressurized air therefrom and an inlet port for receiving atmospheric air when the housing contains a partial vacuum.

6. The apparatus of claim 5 wherein the means operable by the reciprocating motion of a rod comprises a piston attached to a rod, said piston being reciprocable within a cylinder for compressing air.

UNITED STATES PATENT AND TRADEMARK OFFICE
CERTIFICATE OF CORRECTION

PATENT NO. : 4,103,490
DATED : Aug. 1, 1978
INVENTOR(S) : Alexander Moiseevich Gorlov It is certified that error appears in the above-identified patent and that said Letters Patent are hereby corrected as shown below:

Address change requested - the address on the patent now reads:

234 Main St., Brighton, Mass. 02115 the correct address should read:

234 Main St., Medford, Mass. 02155

Signed and Sealed this

Sixth Day of March 1979

[SEAL]

Attest:

RUTH C. MASON
Attesting Officer

DONALD W. BANNER
Commissioner of Patents and Trademarks